(12) United States Patent
Redding et al.

(10) Patent No.: US 11,300,106 B2
(45) Date of Patent: Apr. 12, 2022

(54) SYSTEM AND METHOD FOR UTILIZING WEAR DEBRIS SENSOR TO REDUCE DAMAGE AND EXTEND REMAINING USEFUL LIFE OF GEARBOXES

(71) Applicant: Poseidon Systems, LLC, Rochester, NY (US)

(72) Inventors: Mark L. Redding, Victor, NY (US); Ryan C. Brewer, Webster, NY (US); Stephen N. Steen, Westerville, OH (US)

(73) Assignee: Poseidon Systems, LLC, Rochester, NY (US)

( * ) Notice: Subject to any disclaimer, the term of this patent is extended or adjusted under 35 U.S.C. 154(b) by 137 days.

(21) Appl. No.: 16/515,201

(22) Filed: Jul. 18, 2019

(65) Prior Publication Data

US 2020/0025177 A1    Jan. 23, 2020

Related U.S. Application Data

(60) Provisional application No. 62/699,790, filed on Jul. 18, 2018.

(51) Int. Cl.

| | |
|---|---|
| *F03D 17/00* | (2016.01) |
| *F03D 7/00* | (2006.01) |
| *F16H 57/04* | (2010.01) |
| *F16H 57/01* | (2012.01) |
| *F03D 7/02* | (2006.01) |

(52) U.S. Cl.
CPC .............. *F03D 17/00* (2016.05); *F03D 7/00* (2013.01); *F03D 7/0288* (2013.01); *F16H 57/01* (2013.01); *F16H 57/0405* (2013.01); *F05B 2260/4031* (2013.01); *F05B 2260/80* (2013.01); *F05B 2270/107* (2013.01);
(Continued)

(58) Field of Classification Search
CPC ........ F05B 2270/109; F05B 2270/1095; F05B 2270/32; F05B 2270/404; F03D 7/0288; F03D 7/00–06; F03D 17/00; F16H 57/01; F16H 57/0405
See application file for complete search history.

(56) References Cited

U.S. PATENT DOCUMENTS

| | | |
|---|---|---|
| 7,328,128 B2 | 2/2008 | Bonanni et al. |
| 7,581,434 B1 | 9/2009 | Discenzo et al. |

(Continued)

FOREIGN PATENT DOCUMENTS

| | | |
|---|---|---|
| DE | 60311271 | 5/2007 |
| DE | 60121295 | 6/2007 |

(Continued)

OTHER PUBLICATIONS

Poseidon Systems Trident DM4600, Poseidon Systems, LLC brochure; 2 pages. Jan. 1, 2015.
(Continued)

*Primary Examiner* — Topaz L. Elliott
(74) *Attorney, Agent, or Firm* — Duane C. Basch; Basch & Nickerson LLP (57) ABSTRACT

A system and method employing wear debris sensors to monitor the operation of a lubricated mechanical system such as a gearbox (e.g., in a wind turbine), a transmission or an engine in order to control operation of the gearbox in order to reduce damage and/or extend the useful life of the gearbox.

18 Claims, 8 Drawing Sheets

(52) U.S. Cl.
CPC ... *F05B 2270/1095* (2013.01); *F05B 2270/32* (2013.01); *F05B 2270/404* (2013.01); *F16H 2057/012* (2013.01)

(56) References Cited

U.S. PATENT DOCUMENTS

| | | | |
|---|---|---|---|
| 7,895,016 B2* | 2/2011 | Vittal | G06Q 10/06 |
| | | | 702/184 |
| 8,190,394 B2 | 5/2012 | Davis et al. | |
| 8,538,729 B2* | 9/2013 | Gram-Hansen | G05B 23/0221 |
| | | | 702/182 |
| 11,047,366 B2* | 6/2021 | Nohara | F03D 15/10 |
| 2010/0082295 A1* | 4/2010 | Gram-Hansen | F03D 17/00 |
| | | | 702/182 |
| 2010/0138267 A1* | 6/2010 | Vittal | F03D 7/048 |
| | | | 702/184 |
| 2012/0025529 A1* | 2/2012 | Davis | F03D 80/70 |
| | | | 290/44 |
| 2012/0257968 A1* | 10/2012 | Dalsgaard | F03D 7/0264 |
| | | | 416/1 |
| 2013/0161956 A1* | 6/2013 | Evans | F03D 7/042 |
| | | | 290/44 |
| 2014/0103652 A1* | 4/2014 | Ubben | F03D 7/028 |
| | | | 290/44 |
| 2014/0363290 A1* | 12/2014 | Jacobsen | F03D 15/00 |
| | | | 416/1 |
| 2015/0116131 A1* | 4/2015 | Ikeda | F03D 17/00 |
| | | | 340/870.07 |
| 2017/0074245 A1* | 3/2017 | Miranda | F03D 7/028 |
| 2019/0145381 A1* | 5/2019 | Gbadamassi | F03D 13/35 |
| | | | 73/455 |
| 2019/0293055 A1* | 9/2019 | Nohara | F03D 17/00 |
| 2021/0054824 A1* | 2/2021 | Ishimitsu | F03D 7/0292 |

FOREIGN PATENT DOCUMENTS

| | | | |
|---|---|---|---|
| EP | 1930855 | 6/2008 | |
| EP | 2169221 | 3/2010 | |
| EP | 2169221 A2 * | 3/2010 | F03D 15/00 |
| WO | WO2007090723 | 8/2007 | |

OTHER PUBLICATIONS

"Poseidon Systems completes deployment of large-scale metallic wear debris monitoring system:," author Paul Dvorak; www.windpowerengineering.com/conditions-monitoring-maintenance.com; 3 pages. Dec. 1, 2017.

FAG WiPro Wind Turbine Protection; Schaeffler Group Industrie, 10 pages. Mar. 1, 2008.

Dewi Magazin Nr.19, Dewek2006: Preliminary Programme; 6 pages. Aug. 1, 2006.

ECN-C--03-047; Wind Turbine Operation & Maintenance based on Condition Monitoring Final Report; T.W. Verbruggen; 32 pages. Apr. 1, 2003.

EPRI; Coditions Monitoring of Wind Turbines; Global Energy Concepts, LLC; 110 pages. Mar. 1, 2006.

Gastops; Managing Gearbox Failure, S. Leske et al.; 4 pages. 2006.

7th World Wind Energy Conference; Oil Debris Monitoring for Mitigating Revenue and Cost Risks Associated with Gearbox Unrelaibility; 10 pages. Jun. 24, 2008.

English Translation of Patent EP2169221; 14 pages. Mar. 31, 2010.

Notice of Opposition of Patent EP2169221; 5 pages. 2015.

* cited by examiner

SYSTEM AND METHOD FOR UTILIZING WEAR DEBRIS SENSOR TO REDUCE DAMAGE AND EXTEND REMAINING USEFUL LIFE OF GEARBOXES

This application claims priority under 35 U.S.C. § 119(e) to U.S. Provisional Patent Application No. 62/699,790 for a SYSTEM AND METHOD FOR UTILIZING WEAR DEBRIS SENSOR TO REDUCE DAMAGE AND EXTEND REMAINING USEFUL LIFE OF GEARBOXES, filed Jul. 18, 2018 by Mark L. Redding, et al., which is hereby incorporated by reference in its entirety (including Appendices A-C).

The disclosed embodiments are directed to the use of a wear debris sensor (e.g., Poseidon Systems' Trident™ DM4500, DM4600, etc.) to reduce damage and extend remaining useful life of transmissions, gearboxes, engines and similar mechanical devices employing an oil lubrication system, such as those employed in wind turbines and other equipment.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY

The critical nature of gearboxes employed in industrial equipment such as wind turbines and the like is well known. Thus, the need for consistent lubrication of such gearboxes is also known, and oil filtration systems are employed with circulating pumps to assure that the level of contamination in the gearbox lubrication oil is controlled. As one example, described by P. Dvorak in Windpower Engineering (www-.windpowerenqineering.com; Dec. 7, 2017), the use of a debris sensor to monitor wear in wind turbines has been demonstrated. Similarly, a system as described in U.S. Pat. No. 8,190,394 to Davis et al., hereby incorporated by reference in its entirety, may be employed to monitor oil conditions and then apply a severity level and take a predefined course of action based upon an oil parameter. However, the courses of action are generally described as turbine shut-down to prevent catastrophic failure, or maintenance which also requires shutdown in most situations (oil changes, nacelle inspections, etc.). No systems are known that are able to alter the turbine performance in order to reduce the potential for damage. The disclosed embodiments, on the other hand, are directed to a system and method by which the debris sensor data may be employed to not only monitor wear, but to proactively reduce damage in wind turbine and other mechanical systems employing gearboxes, transmissions and the like, where the system alters performance, yet continues operation, in order to reduce the potential for damage.

Through the use of Poseidon Systems' Trident DM wear debris monitors, the amount of damage sustained by a gearbox can be quantified in terms of actual loss of metal and an associated consumption of component life. Certain components within mechanical systems such as gearboxes, transmissions, engines and similar devices having metal-surface to metal-surface contact or sliding (e.g., gear faces, bearings, cams, etc.) are able to sustain a fair amount of damage and still perform their function. It is only when that damage becomes significant enough to cause a component failure or fracture (e.g., wear, broken gear tooth, broken bearing, broken shaft, galling) that the gearbox can no longer perform its function. At this juncture, either specific parts or the entire gearbox needs to be replaced. The most expensive of these repairs is obviously a complete gearbox replacement. The associated cost is not limited to the cost of the gearbox, but includes crane and labor costs and loss of revenue due to lack of power generation when a turbine is taken off-line. If the gearbox has failed catastrophically, for example, resulting in a split case and oil draining from the gearbox, additional cleanup and potential environmental costs may also be incurred, in addition to a loss of trade-in credit towards a refurbished gearbox.

Poseidon Systems has developed a knowledge base of operational performance observations and data analysis based upon the output from its wear debris monitors. This "fleet-wide" data analysis has led to the conclusion that for certain types of faults, the rate of fault progression can be significantly reduced through an active monitoring program combined with systems and methods to control or modify operation of a turbine based upon debris monitor output. By implementing such a strategy, wear rates can be dramatically reduced allowing for extended gearbox operating life.

Disclosed in embodiments herein is a method for monitoring wear particles in oil of a wind turbine gearbox, and controlling the wind turbine operation to reduce damage to the gearbox, the method comprising: receiving, from a debris sensor associated with the wind turbine gearbox, a data signal representing at least one debris-related measurement of the oil of the gearbox; storing the data signal to collect a plurality of data signals spanning a period of time; automatically analyzing the stored data signals to determine if a pattern of debris concentration data is suggestive of damage to the wind turbine gearbox; and if so, modifying operation of the wind turbine, during a period in which damage is likely to occur, to reduce the likelihood of damage to the gearbox and/or amount of damage to the gearbox.

Further disclosed in embodiments herein is a system for reducing damage and extending the useful life of a gearbox or similar mechanical system, comprising: a wear debris monitor for monitoring debris in a lubricating liquid of a gearbox lubrication system; a controller suitable for receiving one or more data signals, storing one or more data signals in a memory, and automatically analyzing the stored data signals under programmatic control; a communication channel (e.g., wired and/or wireless) for transferring, from said wear debris monitor to said controller, a data signal representing at least one debris-related measurement of the lubricating liquid; said controller storing, in the memory, a plurality of data signals spanning a period of time and said controller automatically analyzing the stored data signals to determine if a pattern of debris concentration data is suggestive of damage to the gearbox; and if so, said controller modifying operation of a device operatively connected to the gearbox, during a period in which damage is likely to occur, to reduce the likelihood of damage to the gearbox and/or amount of damage to the gearbox.

The various embodiments described herein are not intended to limit the disclosure to those embodiments described. On the contrary, the intent is to cover all alternatives, modifications, and equivalents as may be included within the spirit and scope of the various embodiments and equivalents set forth. For a general understanding, reference is made to the drawings. In the drawings, like references have been used throughout to designate identical or similar elements. It is also noted that the drawings may not have been drawn to scale and that certain regions may have been purposely drawn disproportionately so that the features and aspects could be properly depicted.

DETAILED DESCRIPTION

Figure 1:
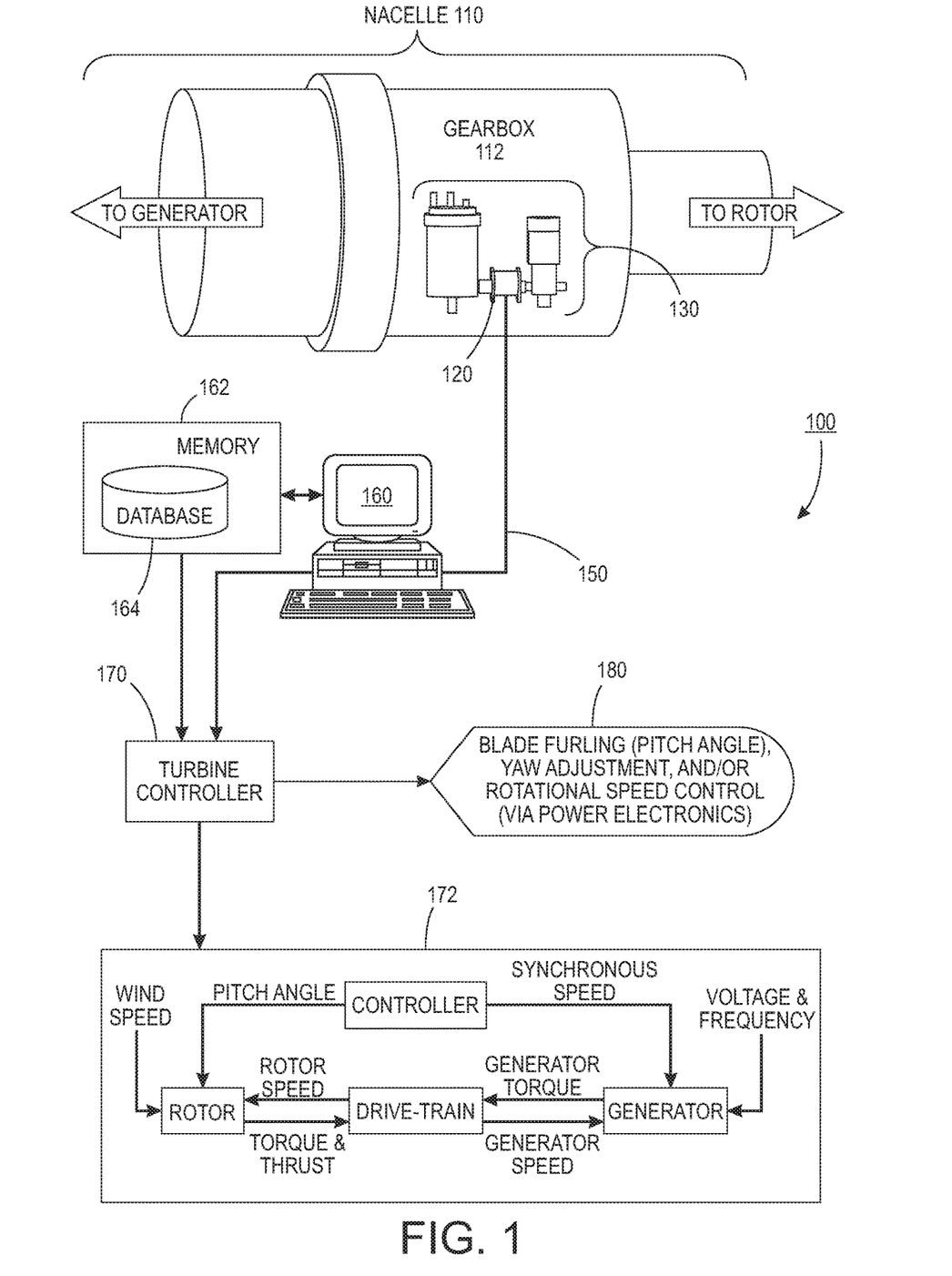
FIG. 1 is a schematic illustration of a wind turbine drivetrain with a gearbox positioned between rotor and generator, with associated oil sensing and filtration in accordance with a disclosed embodiment.

Referring to the figures, the embodiments disclosed herein include a system and/or method(s) for use of a sensor for monitoring wear debris to reduce damage and extend the operational life of a gearbox or similar mechanical systems (e.g., transmissions, engines (bearings and pistons), etc.). In one exemplary embodiment, the mechanical system is a gearbox 112 employed in the nacelle 110 of a wind turbine 100 as partially depicted in FIG. 1. In the embodiment, one or more wear debris monitor(s) 120, such as the Poseidon Systems Trident™ DM4600, may be operatively integrated with a CJC® or similar oil filtration system 130, where the debris monitor is placed between a liquid/oil pump and a filter as shown. While other oil parameters may be monitored in conjunction with or separate from debris (e.g., wear particles), the disclosed embodiment employs the sensor for monitoring wear debris to measure characteristics of the debris (e.g., detection, categorize (ferrous vs. non-ferrous), and size) within the lubrication system and the circulating oil. As will be further appreciated, a debris monitor or sensor may be installed either in a filter bypass, with or without a secondary filtration system as illustrated in FIG. 1, or in-line with a main filtration system. As noted, an oil filtration system that may be suitable for use in accordance with one or more of the disclosed mechanical system embodiments is an oil filtration system available from CJC® Fine Filters, or equivalent filtration systems. In other words, the disclosed embodiment is non-limiting and aspects of the disclosed system and methods may be suitable for use in both a full-flow sensor configuration, as well as the disclosed installation in combination with a wind turbine gearbox— where the debris sensor is not directly positioned between a pump and filter.

The sensor for monitoring wear debris, and an associated communication channel 150 (e.g. RS485 Modbus RTU), permits the gearbox component wear to be monitored locally or remotely in real time by transmitting data signals representing the wear debris measurements to a controller (e.g., a turbine controller 170 of the wind turbine and/or a separate computer or controller 160 located within or remote to the wind turbine) for subsequent analysis using suitable software programs (programmatic code), algorithms and/or logic. While it will be appreciated that the communication channel 150 may be characterized as a wired RS485 channel, various wired and/or wireless channels may be employed for the transmission of data in accordance with alternative embodiments of the system, both on a local and wide-area basis. Moreover, various configurations may be employed for the collection and storage of the wear debris measurements and related near real-time data. In one embodiment the data is stored in a memory 162 operatively connected to and accessible by the turbine controller 170 and/or the separate computer or controller 160. Moreover, a representation of the data is stored in a database 164 that may be part of memory 162 or separate therefrom. It will be appreciated that the data may be stored in records within the database 164, and that the records may include date-time data so that it is possible for an analysis to be conducted amongst one or more data points using the date-time information to correlate the measurements with other wind turbine performance data (e.g., operating parameters).

As a result of the acquisition, storage, and analysis of wear debris data signals as well as turbine operating parameters collected by the controller (e.g. wind speed, power output), it is possible to determine when, and the conditions under which, damage may occur to the components of the gearbox as well as the severity and extent of any damage that may have already occurred as a result of adverse conditions—particularly those caused by environmental conditions. Furthermore, a system can use such wear debris data to automatically modify the operating parameters of the wind turbine in order reduce the damage occurring and/or to prevent further damage from occurring to the gearbox while the environmental conditions persist.

As shown, the wind turbine 100 may also include a turbine control system or a turbine controller 170 within or operatively associated with the nacelle 110. Turbine controller 170 may also be disposed at a remote location physically separated from the wind turbine but in communication therewith. In general, the turbine controller 170 may be configured to transmit and execute wind turbine control signals and/or commands in order to control the operating modes and sequences, as well as individual components of the wind turbine 100. For example, the controller 170 may execute programmatic controls based upon software code and programmable settings 172, and may be configured to control the blade pitch or pitch angle of each of the rotor blades (not shown), thereby controlling the load placed on the gearbox and in turn the power output generated by the generator in the wind turbine 100. As will be appreciated, adjusting an angular position of the blades relative to the wind may alter the performance of the wind turbine as well as the nature of the forces applied to the gearbox 112.

As one example, the turbine controller 170 may control as an output 180 the pitch angle of the rotor blade(s) by transmitting suitable control signals/commands to a pitch drive or pitch adjustment mechanism (not shown) of wind turbine 100. Similarly, the load on the blades, turbine and gearbox can also be altered by controlling a yaw direction of the nacelle 110 about the vertical axis of the turbine tower (not shown) to position the rotor blades with respect to the direction of the wind. Such alterations can similarly control the load and power generated by the wind turbine 100.

In wind turbine 100, a generator is mechanically coupled to the rotor blades of the wind turbine through gearbox 112. As is generally understood, the rotor shaft typically provides a low speed, high torque input to the gearbox from rotation of the rotor blades. The gearbox converts the low speed, high torque input to a high speed, low torque output to drive the generator. Although not specifically illustrated the gearbox 112 may comprise a planetary gearbox including a plurality of gears (e.g., planetary, ring and sun gears) and bearings for converting the low speed, high torque input of the rotor shaft to a high speed, low torque output for the generator. Gearbox 112 preferably includes a lubrication system 130 or other means for circulating a lubricating fluid such as oil throughout the gearbox. The oil is used to reduce friction between the moving components of the gearbox and may also be utilized to provide cooling for such components, thereby decreasing component wear within the gearbox and increasing the life of the gearbox components.

Wind turbine 100 also includes one or more monitors or sensors for detecting, sensing and/or measuring operating parameters and/or operating conditions of the wind turbine. In one embodiment, among other sensors the monitor may include a sensor for monitoring wear debris for monitoring the number of particles and/or debris (e.g., metallic particles due to component wear) contained within the oil. Output from such a sensor may include, among other characteristics, particle count, particle size, particle category (ferrous/non-ferrous), etc. Sensors suitable for monitoring of wear debris include one or more debris sensing technologies, such as the Poseidon Systems Trident line of sensors, as well as optical debris sensing techniques, inductive coil technologies, ultrasonic technologies, magnetometry and/or electromagnetic technology to determine characteristics of the wear particles contained within the lubricating oil. As will be appreciated the debris sensor may employ any method for counting and sizing individual debris (e.g., metal) particles, or any sensing technology for measuring or estimating material loss. In other words, material loss from components in the mechanical system may be detected via means other than monitoring metallic debris using a sensor in the lubricant stream.

In one embodiment, the sensor for monitoring wear debris is a real-time, in-line fluid sensing technology for the detection of metallic wear debris and particulates in a lubrication system. By continuously monitoring wear debris generation, the sensor for monitoring wear debris may be employed to alert users to faults in their earliest stages, allowing for lower cost correction actions than conventional schedule-based maintenance. The Poseidon Wear Debris Monitor will detect, categorize and size particles within a gearbox lubrication system. The monitor will detect and measure particles with an estimated spherical diameter as small as 40 micron ferrous and 150 micron non-ferrous and larger. A wide range of outputs (data signals) are available including particle type/size, approximate mass, and particle counts in user configurable bins. In addition to the particle size/mass estimates, the wear debris sensor is also capable of producing volumetric flow rate estimates and total particle count estimation. While the disclosed sensor for monitoring wear debris is characterized as operatively connected to an in-line fluid sensing system, it will be appreciated that the sensor and techniques described herein may also be employed with integrated or alternative debris sensor designs.

The embodiment described above permits the oil condition of the gearbox 112 to be monitored locally or remotely in real-time by periodically obtaining measurements of one or more of the wear debris or other oil parameters and transmitting data signals corresponding to such measurements to controller 160 and/or turbine controller 170 for analysis using software, algorithms and/or decision logic stored as computer-readable instructions within such controller(s). As will be appreciated, one or more features described may be implemented using a supervisory control and data acquisition (SCADA) control system architecture that uses computers/controllers, networked data communications and various interfaces for high-level process management, but uses other devices such as controllers and discrete controllers to interface to the turbines. Such acquisition and analysis of near real-time data corresponding to the nature of wear generation within the gearbox oil allows for the timely detection of damage that may be occurring to the components of the gearbox and for the adjustment of turbine operation to reduce or avoid damage.

Poseidon Systems' Trident DM product line of wear debris monitors count and size individual metal particles as oil flows through the sensor. Individual particles are "binned" into various size ranges and calculations are made to estimate the total mass observed. By knowing what fraction of oil the sensor sees in its bypass (or in-line circulation), along with the assumption that the sensor is seeing a representative sample of the gearbox oil, a simple scaling can be made to estimate a total mass of wear particles shed by the gearbox components. Additionally, given the flow rate of oil through the sensor, a calculation of metal concentration can be made. This calculation can be made for different time periods; a computed metal concentration can be made for each sensor measurement reporting interval, or averaged over longer periods of time (e.g., 1-hour and 24-hour averages). The system uses these various concentrations in modes such as alarming and diagnosis of problems. As one example, a gear tooth crack will exhibit different characteristics from a bearing spall, both in the wear particle size and concentration.

Referring also to FIGS. 2-6, the following discussion will further describe the method by which gearbox damage can be prevented by proactively recognizing and characterizing wear-causing conditions and proactively adjusting the wind turbine operation to reduce damage under certain circumstances.

Figure 2:
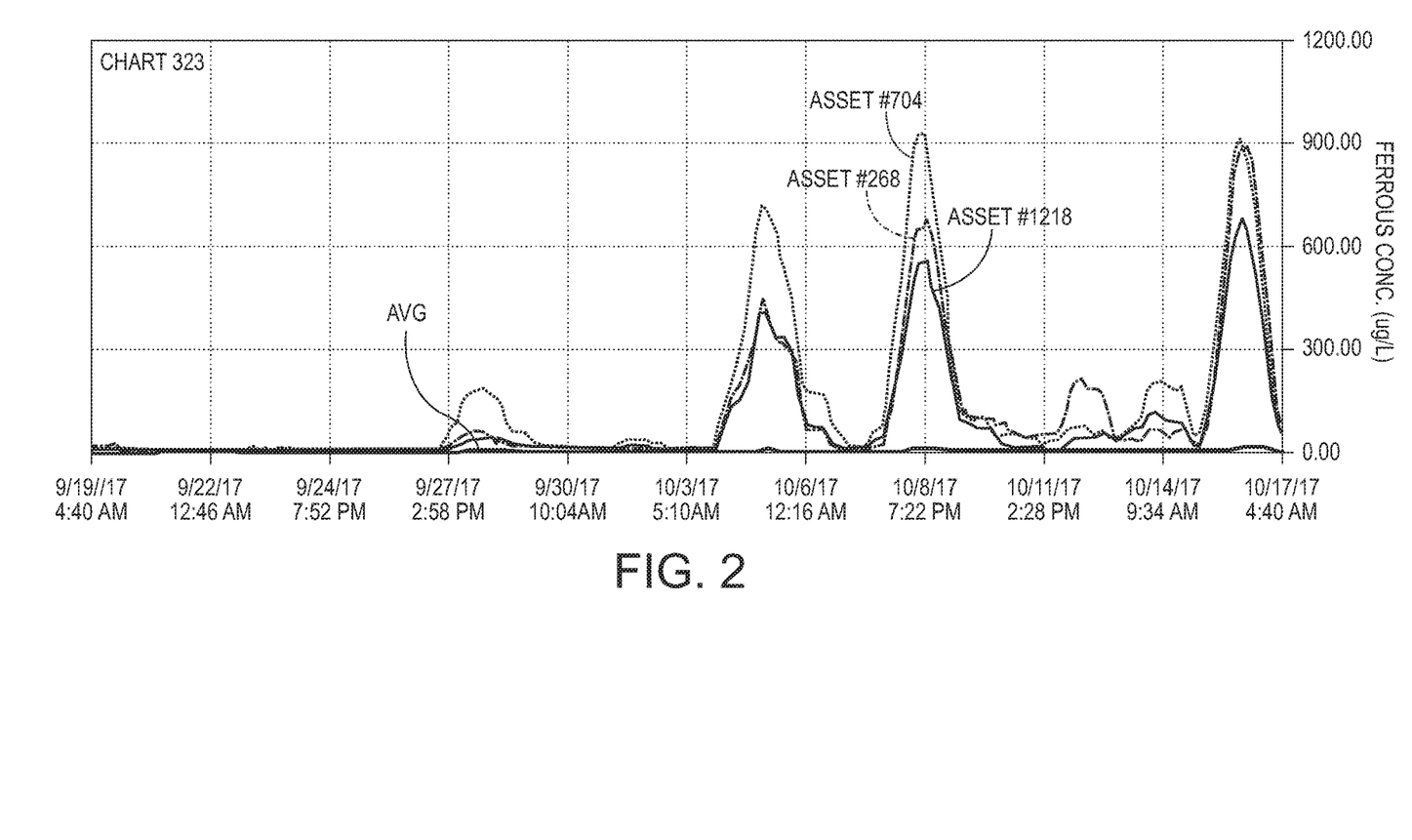
FIG. 2 is a chart representing elevated 24-hour average wear concentration values for three wind turbines over a 1-month period relative to the site average.
Figure 3:
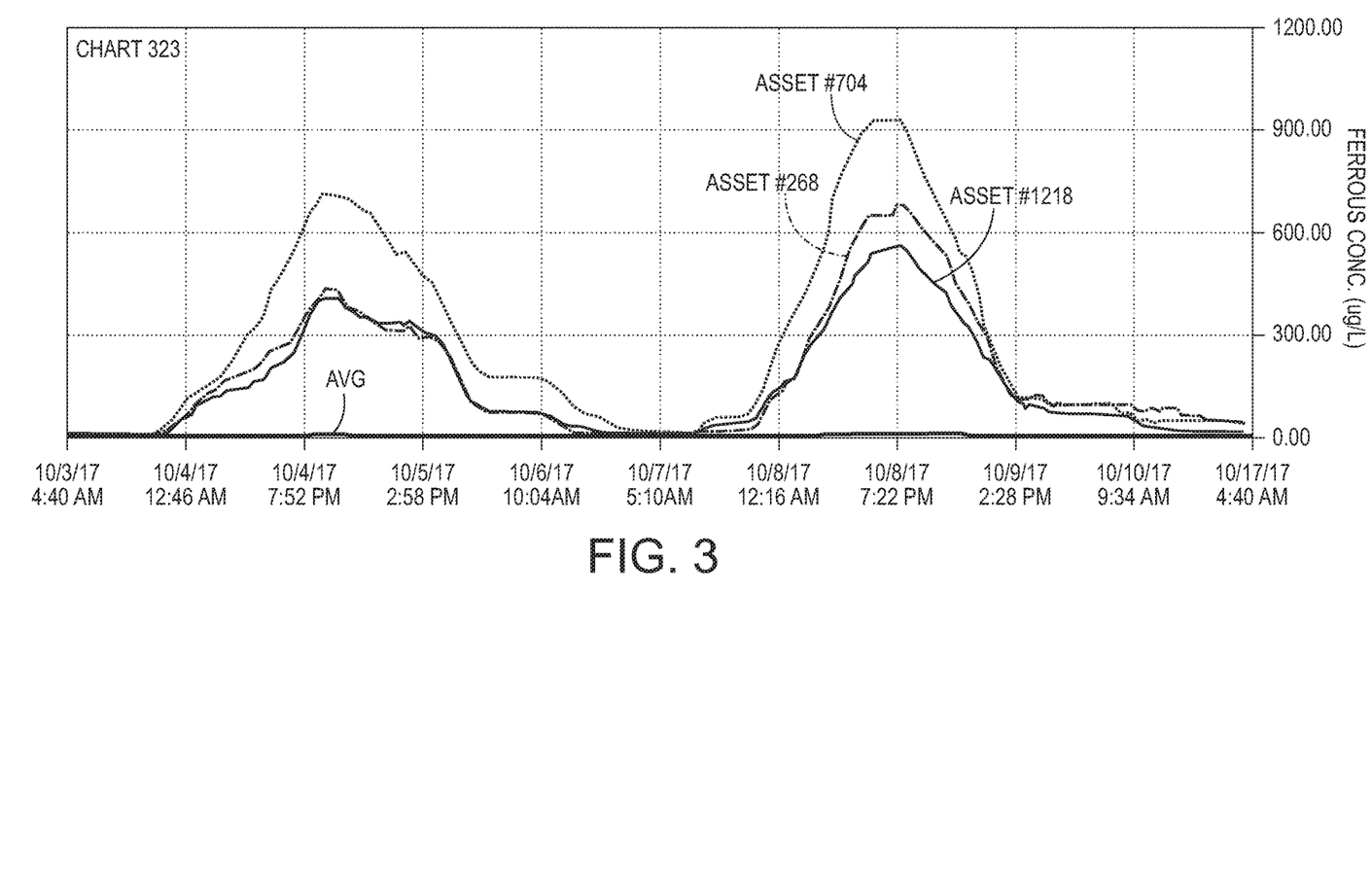
FIG. 3 is chart representing the 24-hour average wear concentration values for three wind turbines over an 8-day period illustrating the similarity of wear generation for three specific turbines.

The charts set forth in FIGS. 2-3 relate to fifteen gearboxes monitored by Poseidon Trident DM4500's at one site. These gearboxes are either known or suspected faulty gearboxes based on prior inspections. The chart of FIG. 2 is a representation of a 4-week period where the computed 24-hour average wear debris concentration is plotted over time for three of the fifteen gearboxes along with the average of the other twelve gearboxes on the same chart. Each different line represents one gearbox ("Asset #" as labeled). The magnitude of these wear debris concentrations is reported in micrograms/liter (μg/l) and utilizes the scale represented on the right-hand axis.

What is observed in FIG. 2 is that there are three gearboxes that exhibit significantly higher rates of damage (wear debris) than the average for other monitored gearboxes at this site. The damage in the three outlier gearboxes is highly correlated with time, suggesting these wear debris peaks are environmentally driven events, where damage is occurring over a relatively short period of time, which then subsides until the next event. For this one-month period, six events were observed with varying magnitudes of damage. It is evident that observed damage is driven by environmental (e.g., wind speed, wind gusts) factors that all of these turbines would have experienced at approximately the same time.

Referring next to FIG. 3, the same wear debris information (e.g., 24-hour ferrous concentration), is plotted for a shorter timeframe (8 days instead of 4 weeks). In FIG. 3, two discrete events (e.g., concentration peaks) are observed, where the concentration (i.e., rate of damage) pattern is extremely similar for the three gearboxes of interest. If one takes a closer look at just the gearbox associated with the top line in the above chart (Asset #704) and plots both 24-hour concentration and observed cumulative mass for this period, the chart of FIG. 4 can be generated—where the Asset #704 line now represents cumulative mass (mg) and utilizes the left-hand axis scale, and the broken line (410) is 24-hour iron concentration (μg/l) and utilizes the right-hand axis. Once again, one will observe that each of these events (starting on Oct. 4, 2017 and Oct. 8, 2017) last for approximately 24 hours, and that the majority of debris mass is generated during these events.

Figure 4:
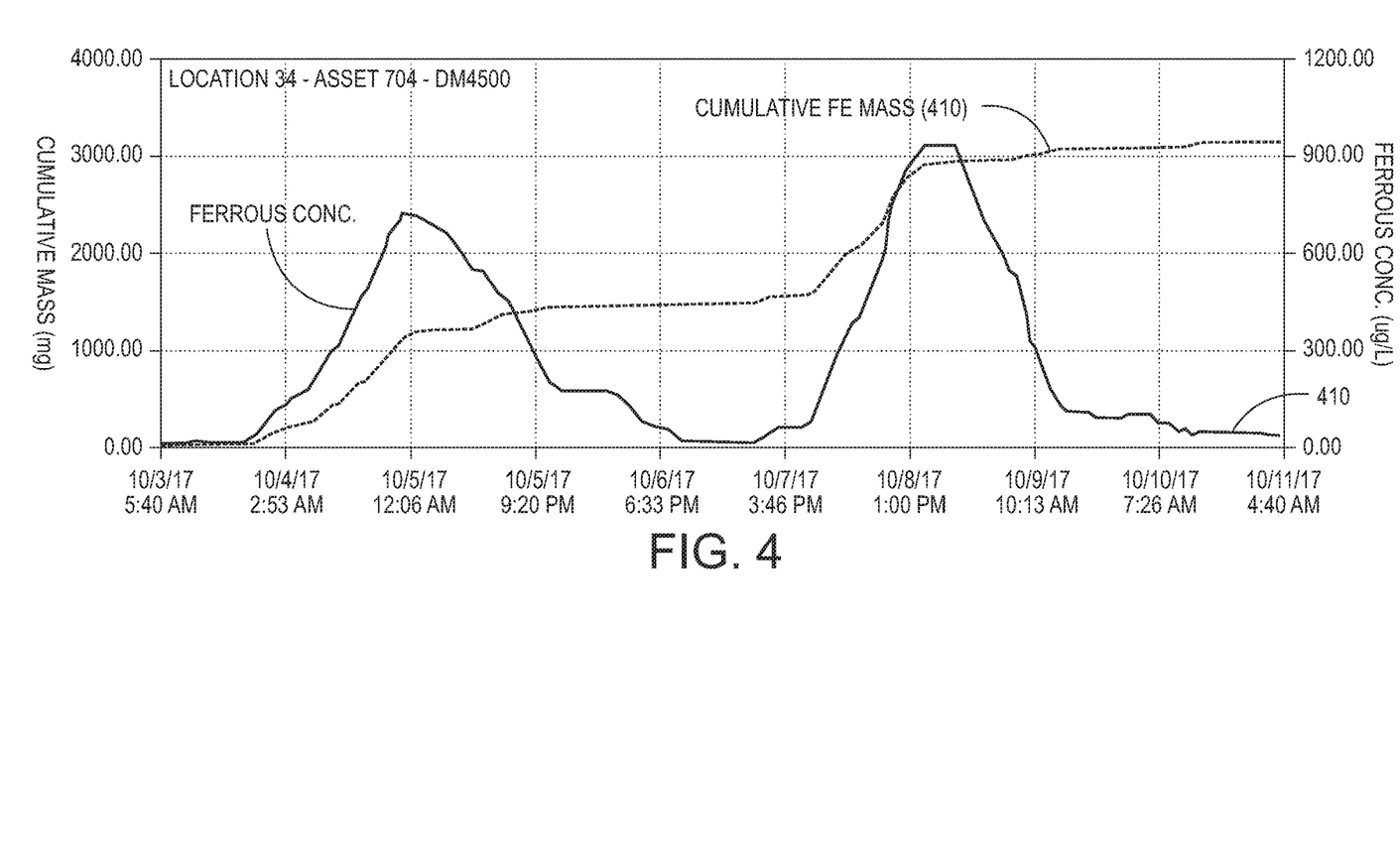
FIG. 4 is chart representing the 24-hour average wear concentration and the observed cumulative wear mass a specific turbine over an 8-day period.
Figure 5:
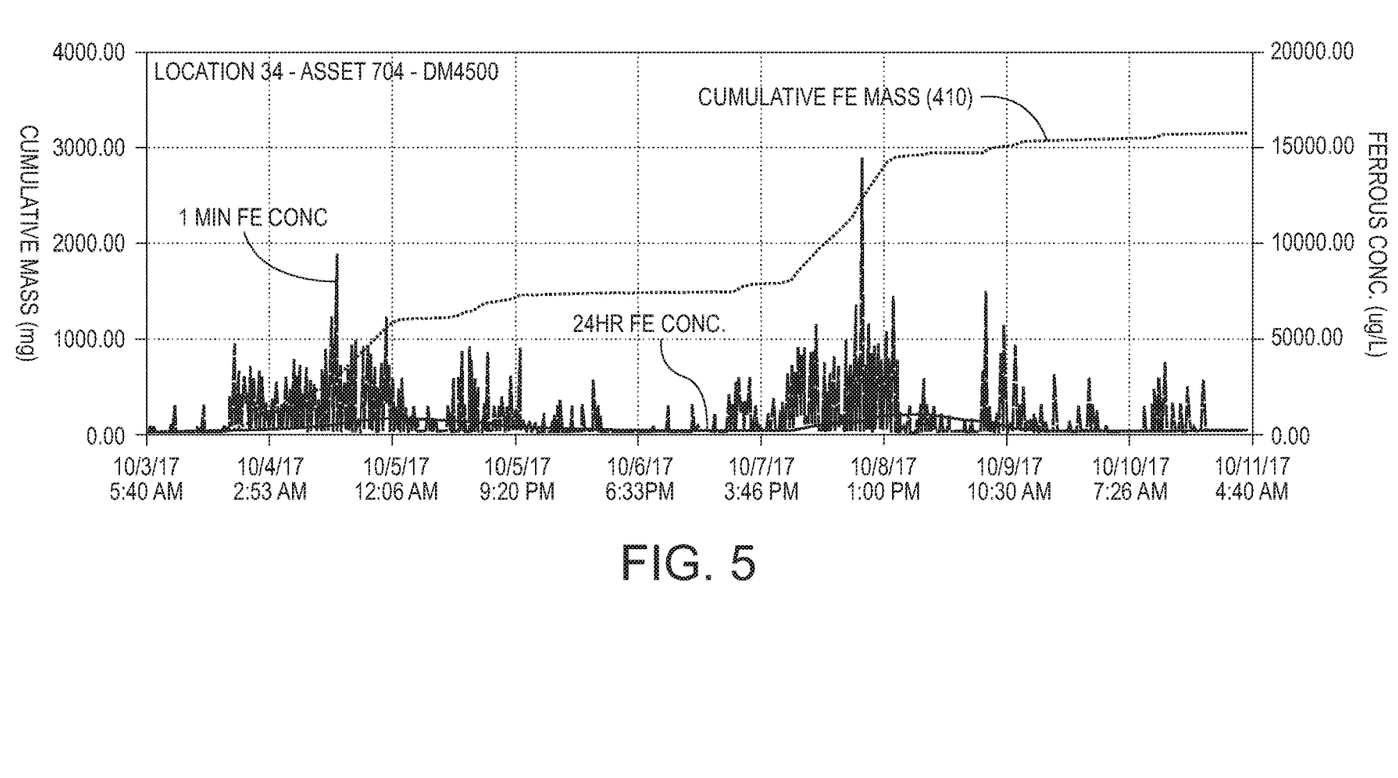
FIG. 5 is chart representing the 24-hour average wear concentration, 1-minute average wear concentration, and the observed cumulative wear mass for a specific turbine over an 8-day period.
Figure 6:
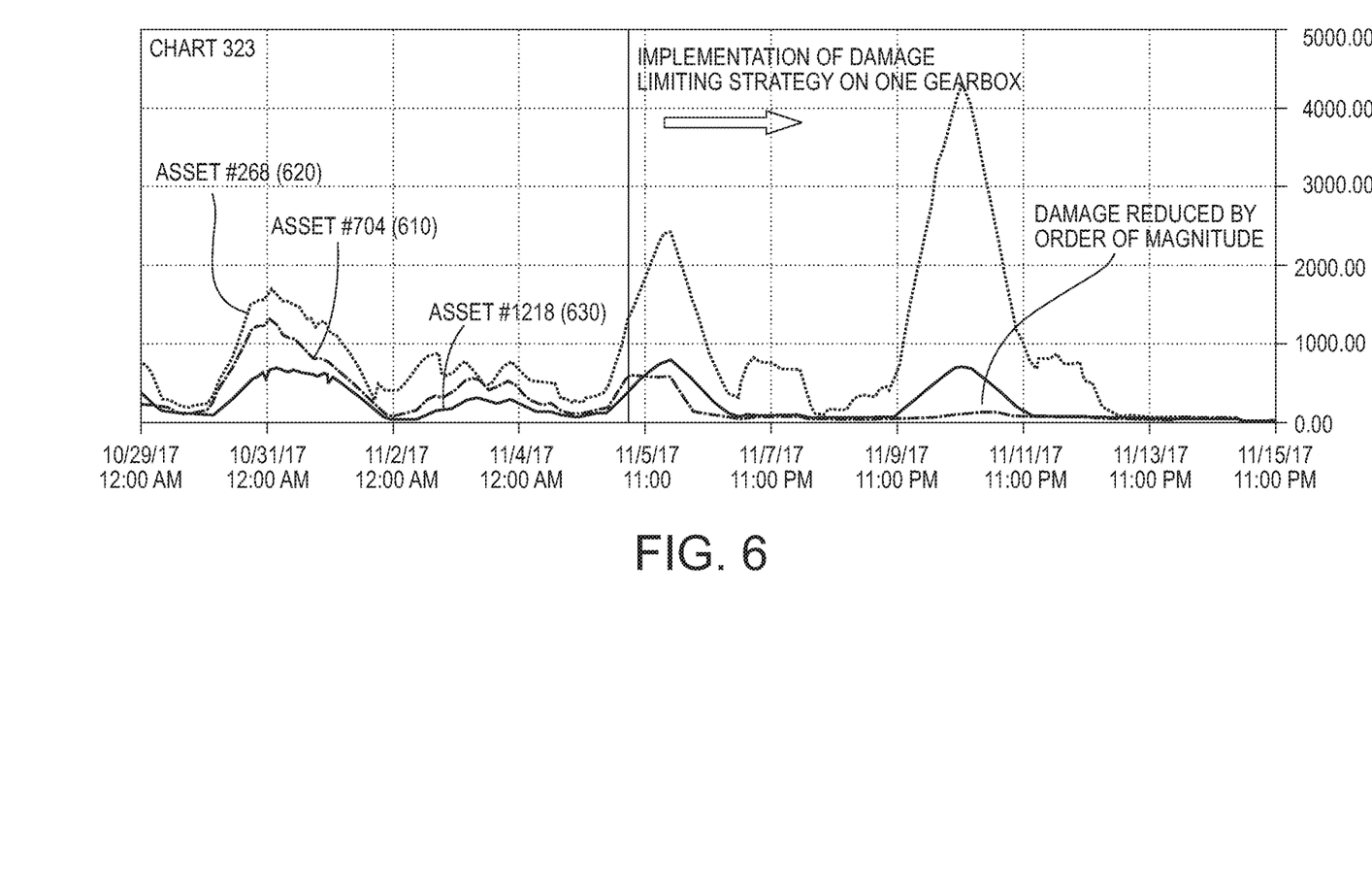
FIG. 6 is chart representing the 24-hour average wear concentration values for three wind turbines over a 4-day period illustrating the effect of implementing a derating strategy on one of three turbines with similar wear generation rates.

Turning next to FIG. 5, 1-minute ferrous concentration levels (dashed line) is added to the plot along with the other two variables as in FIG. 4. Note that the 24-hour concentration (410) is still plotted, but because the scale has changed to accommodate the values associated with the one-minute data, the peaks are less pronounced. Near real-time assessments of wear rate, such as the plotted 1-minute concentration can be used to detect elevated wear rates and manipulate turbine control to minimize further damage.

By implementing an active monitoring method and control system, the onset of a wear event can be detected and, through management of turbine operation, the otherwise ensuing damage can be reduced or eliminated. If the control scheme were implemented within the first 30 to 60 minutes from the start of a detected event, a majority of the loss of metal associated with that event is preventable.

An alternative approach is also considered where a combination of wear debris data and SCADA information is used to "learn" what the primary drivers for wear debris formation are, and then limit turbine operations during these scenarios. This process is illustrated by FIGS. 7-8.

Figure 7A:
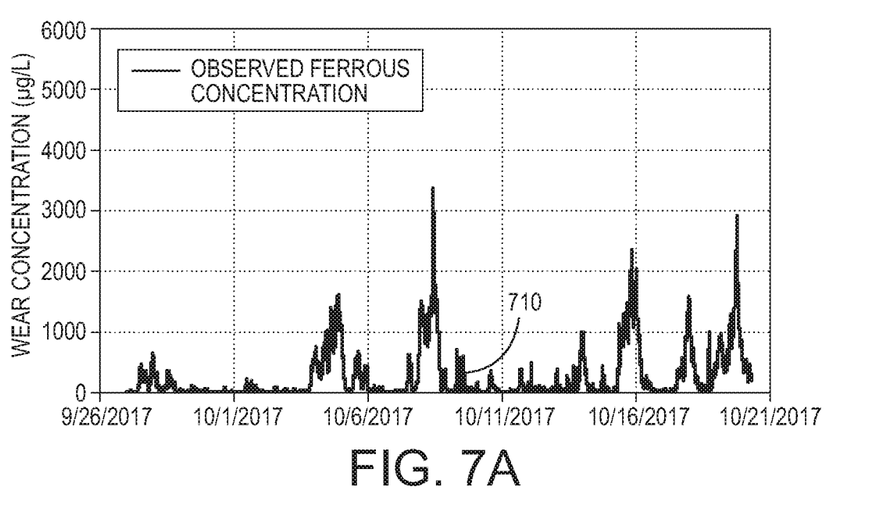
FIGS. 7A-7B are charts illustrating a comparison of observed ferrous wear concentration versus ferrous wear rate which is predicted based on operating conditions.
Figure 7B:
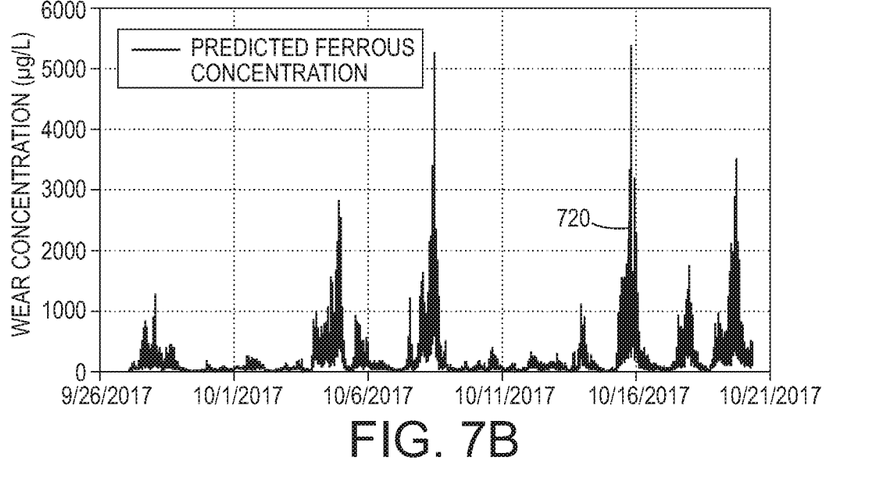

Referring to FIGS. 7A-7B, line 710 of FIG. 7A is indicative of the 1-hour average ferrous wear debris as observed from an operating wind turbine, while line 720 of FIG. 7B is a prediction of ferrous concentration based solely on SCADA parameters (e.g. wind speed, power generation, wind turbulence, etc.). An equation for the predicted wear rate may be derived from prior operational data using methods readily known to someone skilled in the art of multi-variate data analysis and/or machine learning. If a strong correlation can be achieved between predicted and measured wear rate, the turbine's operation can be modified to reduce future wear.

Figure 8A:
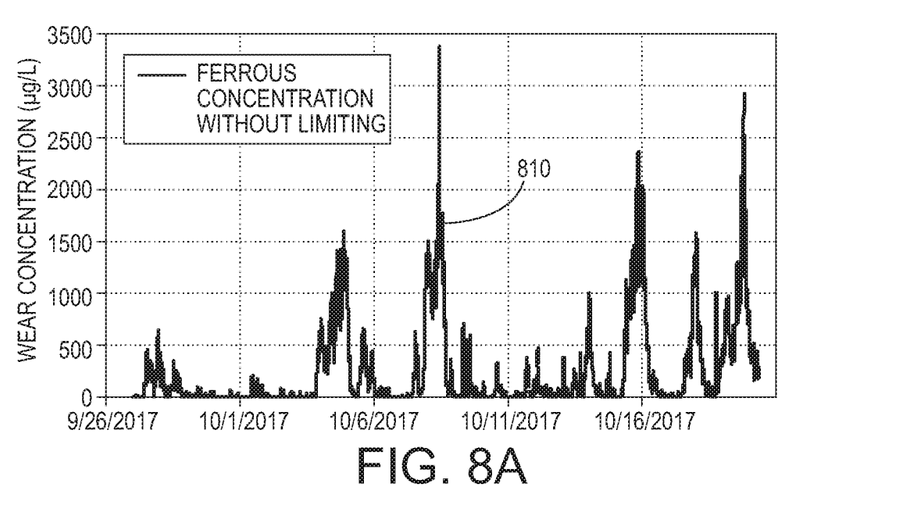
FIGS. 8A-8B are charts illustrating the potential for wear reduction based on learning operating conditions which promote wear and altering the control strategy to reduce damage.
Figure 8B:
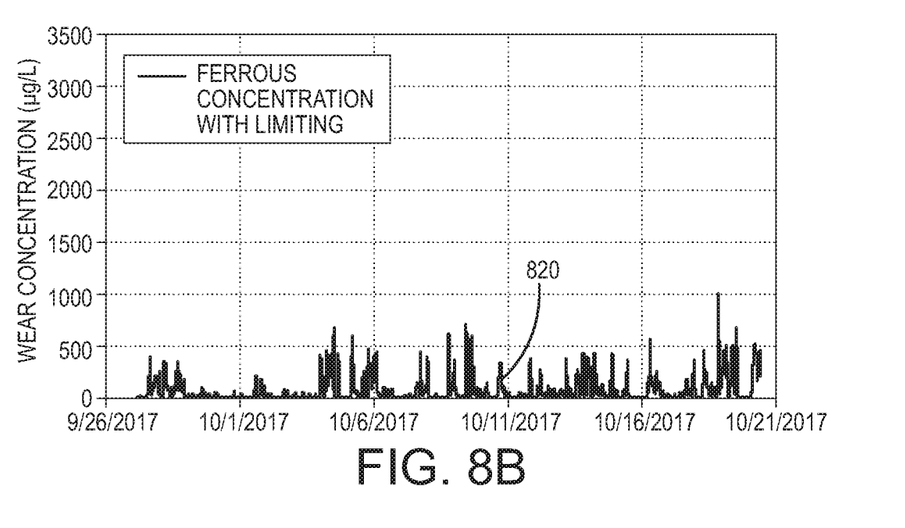

The potential for limiting wear based on turbine operation is further illustrated in FIGS. 8A-8B. FIG. 8A again represents the actual wear observed by the turbine in line 810, while line 820 of FIG. 8B represents the wear levels that would have been observed if the predicted wear levels were used to limit future damage. In this scenario, to simplify the example, the predicted wear levels were calculated solely as a function of maximum wind speed. Implementing a wear limiting strategy where turbine operations are halted when winds exceed or are predicted or forecast to exceed a pre-defined threshold such as 12 m/s, and keeping the turbine offline for 28 minutes following an exceedance would have resulted in a 70% reduction in wear and a 49% reduction in power production. The ability to avoid or reduce wear in this way equates to a more than threefold extension in remaining useful life at a cost of less than half the revenue expected from the turbine during the reduced operational period.

The disclosed approach for management of a mechanical system to increase life by reducing damage due to wear (e.g., wind turbine gearbox life management) can be used to optimize the cost-benefit for each gearbox failure scenario. Varying controls strategies can be implemented depending on the desired life extension. Historical data and forecasts can also be used to predict what the impact of various controls strategies will be on both the remaining useful life (RUL) and power production.

Implementation of Damage-Limiting Methodology

The following is a brief discussion of a methodology whereby one or more operating parameters of a wind turbine are employed to modify the turbine's operation (e.g., derating by changing blade pitch, yaw, etc.). In taking a first step to demonstrate the potential for a damage limiting strategy, for one of the three subject gearboxes, a derating strategy was employed. For the sake of this example, a derating strategy was utilized, however, alternative methods that result in reduced damage without reducing the power output of the machine may also be considered.

For the experiment, the gearbox that had exhibited the greatest amount of wear over a one-month period was selected to implement the damage-limiting strategy, and at the start of what was a significant damage event, the selected turbine was derated (i.e. actively controlled to reduce power output). Considering FIG. 6, it is clear how effective this strategy was in preventing damage from occurring by comparing the damage sustained by the derated gearbox (Asset #704) with the damage sustained by the other two gearboxes (see FIGS. 2-5) where such a strategy was not employed. If one visually compares the concentration of wear debris of the derated turbine (Asset #704 (610)) with the other two (lines 620 and 630), the reduction in concentration is significantly reduced.

Ultimately, the disclosed system and method will employ a control strategy that will not only monitor the wear debris concentration levels but shall trigger a derating or similar proactive control output from the turbine controller to reduce or eliminate wear in harsh operating conditions. A combination of the wear debris sensor detecting a threshold amount of damage and/or the correlation of a wind regimen that is deemed to be damaging could be employed to initiate the derating. The control strategy would be imposed for only a few minutes or few hours depending on the severity of both the environmental conditions and the overall condition of the gearbox. In other words, the control strategy may be based upon other characteristics, and may be tailored to individual gearboxes. For example, wind turbines having gearboxes with significantly more hours of use, specific fault types, and/or higher average wear debris concentrations, etc., may be derated more quickly (e.g., upon lower debris levels, lower wind gust speed, etc.) The control strategy will be automated and carried out by one or both controllers 160 and 170, and may also be driven by a financial model that can consider instantaneous energy prices, compared with cost savings associated with reduced gearbox damage. And, as noted previously, the system may be able to perform such calculations separately for each individual turbine (gearbox). Based on observed data to date, the use of such a system is anticipated to extend the operating life of gearboxes operating with such a control strategy by multiple years—possibly achieving a doubling of the expected life of a turbine gearbox.

As mentioned above, there are various damage mitigating control techniques that may be considered, and one or more of the following may be employed:

absolute derating: Typically, a turbine controller is designed to self-regulate its power output to a specific design limit, e.g. 1.5 MW. In this damage mitigation technique, a new setpoint would be set to reduce damage, e.g. 1.3 MW.

wind speed derating; Typically, a turbine controller is designed to self-regulate or shutdown beyond a set wind speed, e.g. 25 m/s it may turn off. In this damage mitigation technique, a new setpoint would be set to reduce damage, e.g. reduce to 1.3 MW at 20 m/s.

wind sheer derating; Typically, a turbine controller is designed to self-regulate or shutdown beyond a set wind shear, e.g. 0.2 it may turn off. In this damage mitigation technique, a new setpoint would be set to reduce damage, e.g. reduce to 1.3 MW at 0.15.

wind turbulence derating; Typically, a turbine controller is designed to self-regulate or shutdown beyond a set turbulence, e.g. 18% it may turn off. In this damage mitigation technique, a new setpoint would be set to reduce damage, e.g. reduce to 1.3 MW at 16%.

torque-based derating; Typically, a turbine controller is designed to self-regulate or shutdown beyond a set drivetrain torque, either calculated or using a sensor. In this damage mitigation technique, a new setpoint would be set to reduce damage.

load controls algorithm selection; Typically, a turbine controller is designed with several controls types, setpoints, and calibration which are selected based on typical or current site conditions. In this damage mitigation technique, alternative controls would be used based on damage mitigation.

blade pitch control modifier; Typically, a blade pitch controller is designed with several controls types, setpoints, and calibration which are selected based on typical or current site conditions. In this damage mitigation technique, alternative controls would be used based on damage mitigation.

individual blade pitch control modifier; Typically, an individual blade controller is designed with several controls types, setpoints, and calibration which are selected based on typical or current site conditions. In this damage mitigation technique, alternative controls would be used based on damage mitigation, such as hub pre-load adjustment; and custom controls strategy; At times custom controls are used to solve unique challenges to solve new or similar challenges to the solutions above.

In addition to the metal concentration data employed in the example described above, alternative triggers may be employed to initiate a damage mitigation operation, including:

Absolute wear metal loss; Trigger based on cumulative total metal over time, e.g. total mass loss from time of commissioning.

Wear rate(s); Trigger based on exceeding raw or calculated particle counts or mass wear rates, e.g. exceeding 0.5 for a 24-hour concentration rate. This could also be an absolute difference in wear rates over a given period of time compared to the previous, e.g. a 15% increase over the past 3 days.

Wear particle size; Trigger based on particle size counts or rates within specific bins, e.g. these sometimes correlate to specific failure modes.

Wear particle pattern-based (e.g., N size particles with L patterns indicate X failure mode with Y loading strategy); Trigger based on a combination of items above using patterns detected in time series data, e.g. sporadic wear around certain events correlating to a slipping bearing.

Combination of factors such as energy pricing, maintenance strategy; There may be factors outside of direct wear debris measurements that should be considered in a mitigation strategy, e.g. in merchant energy markets if may be advantageous financially to de-rate only when below specific energy prices.

Correlation of wear debris with events; Events within SCADA, grid, weather, etc. may be key indications of why wear events are occurring, e.g. when wind shear is above 0.15 and power output is 1.3 MW this should be avoided; and Combining wear debris, SCADA data, and/or machine learning. Combining the wear debris data with outside sources and/or using machine learning to identify and detect trigger events, e.g. machine learning algorithm identifies operating conditions that lead to excessive wear.

Although described above as operating on a turbine-by-turbine basis, it may also be possible to implement one or more damage mitigation control strategies on groups of adjacent turbines. For example, using wear particle data signals from neighboring turbines to reduce loading on all turbines in that area, including:

By like turbine make and model;

By like gearbox version; and

By like subcomponent variants.

And, as will be appreciated, the disclosed methodologies may be employed as part of an integrated, closed loop control architecture, including"

Closed loop control at the turbine level;

Closed loop control at the park level controller; and

Closed loop control at the remote SCADA facility/cloud.

It should be understood that various changes and modifications to the embodiments described herein will be apparent to those skilled in the art. Such changes and modifications can be made without departing from the spirit and scope of the present disclosure and without diminishing its intended advantages. It is therefore anticipated that all such changes and modifications be covered by the instant application.

What is claimed is:

1. A method for monitoring debris in oil of a wind turbine gearbox, and controlling the wind turbine operation to reduce damage to the gearbox, the method comprising:

receiving, from a sensor for monitoring wear debris associated with the wind turbine gearbox, a data signal representing at least one debris-related measurement of the oil of the gearbox;

storing the data signal to collect a plurality of data signals spanning a period of time; and automatically analyzing the stored data signals to determine if a pattern of debris concentration data indicates damage to the wind turbine gearbox; and responsive to determining that the pattern of debris concentration data indicates damage,     modifying operation of the wind turbine, during a period in which damage is determined to be likely to occur, to reduce the amount of damage to the gearbox,     obtaining and storing, in memory, data representing one or more environmental characteristics occurring at the wind turbine during the period of time,     analyzing the stored data signals and the data representing one or more environmental characteristics to identify statistical correlation between increased gearbox debris levels, caused by increased wear, and environmental characteristics, and     creating an operation model for use with the wind turbine such that subsequent operation of the wind turbine is modified to reduce the amount of damage to the gearbox in anticipation of or directly in response to an environmental characteristic previously determined to correlate with increased wear or reduce the useful life of the gearbox.

2. The method according to claim 1 where the subsequent wind turbine operation is proactively modified in response to a predicted environmental characteristic.

3. The method according to claim 2 where the predicted environmental characteristic includes wind speed and the proactive modification of the subsequent wind turbine operation occurs when actual or predicted wind speed exceeds a pre-defined threshold.

4. The method according to claim 3 wherein the proactive modification of the subsequent wind turbine operation further includes derating the wind turbine for a period of time following the actual or predicted wind speed exceeding the pre-define threshold.

5. The method according to claim 1, wherein at least one proactive modification of the operation of the wind turbine is selected from the group consisting of: absolute derating, wind speed derating, wind shear derating, wind turbulence derating, torque-based derating, load control algorithm modification, blade pitch control modification and implementing a custom control strategy.

6. The method according to claim 1, wherein the at least one debris-related measurement of the oil of the wind turbine gearbox is indicative of pre-existing wear or damage in the wind turbine gearbox, and where the operation model for use with the wind turbine seeks to prevent further damage to, and avoid catastrophic failure of, the wind turbine gearbox in anticipation of the environmental characteristic.

7. A system for reducing damage and extending the useful life of a wind-turbine gearbox, comprising:

a sensor for monitoring wear debris in a lubricating liquid of a wind-turbine gearbox lubrication system, said sensor generating a debris data signal representing at least one debris-related measurement for the lubricating liquid of the wind-turbine gearbox;

a controller suitable for receiving one or more data signals including the debris data signal, storing the one or more data signals in a memory, and automatically analyzing the stored data signals under programmatic control;

a communication channel for transferring, from said wear debris sensor to said controller, the debris data signal representing at least one debris-related measurement for the lubricating liquid;

said controller storing, in the memory, a plurality of data signals spanning a period of time, said controller further obtaining and storing in the memory, data representing one or more adverse conditions occurring at the wind turbine operatively connected to the wind turbine gearbox during the period of time, and said controller automatically analyzing the stored data signals including debris data signals spanning the period of time to determine if a pattern of debris concentration data is indicative of damage to the wind-turbine gearbox resulting from the one or more adverse conditions occurring at the wind turbine; and     in response to the pattern of debris concentration data indicative of damage to the wind-turbine gearbox correlating to an adverse condition occurring at the wind turbine, said controller modifying operation of the wind-turbine operatively connected to the wind-turbine gearbox, during a period in which damage is likely to occur, to reduce damage to the wind-turbine gearbox.

8. The system according to claim 7, wherein said sensor for monitoring wear debris includes an in-line fluid sensor for detection of metallic wear debris and particulates in the lubrication system.

9. The system according to claim 7, wherein the pattern of debris concentration data indicative of damage to the wind-turbine gearbox indicates pre-existing wear or damage to the wind turbine gearbox, and where the controller modifies operation of the wind turbine to prevent further damage to, and avoid catastrophic failure of, the wind turbine gearbox.

10. A system for reducing damage and extending the useful life of a mechanical system, comprising:

a lubrication system operatively connected to the mechanical system and circulating a lubrication liquid within at least a portion of the mechanical system;

a sensor for monitoring wear debris in the lubrication liquid within the mechanical system, said sensor generating a debris data signal representing at least one debris-related measurement of the lubrication liquid;

a controller configured for receiving one or more data signals relating to operation of the mechanical system and including the debris data signal, storing the one or more data signals in a memory, and automatically analyzing the stored data signals under programmatic control; and     a communication channel for transferring, from said sensor for monitoring wear debris to said controller, the debris data signal representing at least one debris-related measurement of the lubrication liquid;

said controller storing, in the memory, a plurality of data signals including the debris data signal representing at least one debris-related measurement of the lubrication liquid and spanning a period of time, said controller automatically analyzing the stored data signals to identify a pattern of debris concentration data indicative of damage to the mechanical system; and said controller further modifying operation of the mechanical system during a subsequent period in which damage is likely to occur, to reduce damage to the mechanical system, where the controller proactively modifies operation of the mechanical system, in response to the stored data indicating damage correlating to an actual or predicted environmental characteristic exceeding a pre-defined threshold, and modifies operation of the mechanical system for a period of time following the actual or predicted environmental characteristic exceeding the pre-defined threshold.

11. The system according to claim 10, wherein said sensor for monitoring wear debris includes an in-line fluid sensor for detection of metallic wear debris and particulates in the lubrication system.

12. The system according to claim 10, wherein said pattern of debris concentration data includes data representative of debris concentration over time.

13. The system according to claim 12, where said debris concentration data includes a particle size component.

14. The system according to claim 12, wherein the controller employs a trigger based upon a plurality of patterns detected in time-based data.

15. The system according to claim 10 where said controller employs a supervisory control and data acquisition architecture to perform analyses of near real-time data for debris concentration within the mechanical system lubrication liquid corresponding to wear.

16. The system according to claim 10 where said mechanical system is selected from the group consisting of: a transmission, a gearbox, and an engine.

17. The system according to claim 10 where said mechanical system includes at least one wind turbine.

18. The system according to claim 10, wherein the pattern of debris concentration data indicative of damage to the mechanical system indicates pre-existing wear or damage to the mechanical system, and where the controller modifies operation of the mechanical system to prevent further damage to, and avoid catastrophic failure of, the mechanical system.

* * * * *